US012623457B2

(12) United States Patent
Tsuji et al.

(10) Patent No.: US 12,623,457 B2
(45) Date of Patent: May 12, 2026

(54) INK SUPPLY STRUCTURE FOR INKJET HEAD

(71) Applicants: SCREEN Holdings Co., Ltd., Kyoto (JP); KYOCERA CORPORATION, Kyoto (JP)

(72) Inventors: Takanori Tsuji, Kyoto (JP); Tomonori Yasuda, Kyoto (JP); Shigeki Matsuo, Kyoto (JP); Masaru Iwabuchi, Kyoto (JP)

(73) Assignees: SCREEN Holdings Co., Ltd., Kyoto (JP); KYOCERA CORPORATION, Kyoto (JP)

( * ) Notice: Subject to any disclaimer, the term of this patent is extended or adjusted under 35 U.S.C. 154(b) by 133 days.

(21) Appl. No.: 18/687,721

(22) PCT Filed: Jul. 21, 2022

(86) PCT No.: PCT/JP2022/028395
§ 371 (c)(1),
(2) Date: Feb. 28, 2024

(87) PCT Pub. No.: WO2023/047780
PCT Pub. Date: Mar. 30, 2023

(65) Prior Publication Data
US 2024/0367434 A1 Nov. 7, 2024

(30) Foreign Application Priority Data
Sep. 24, 2021 (JP) ................................ 2021-156146

(51) Int. Cl.
*B41J 2/14* (2006.01)
*B41J 2/175* (2006.01)
(Continued)

(52) U.S. Cl.
CPC ....... *B41J 2/14201* (2013.01); *B41J 2/17596* (2013.01); *B41J 2/18* (2013.01);
(Continued)

(58) Field of Classification Search
CPC ...... B41J 2/14201; B41J 2/17596; B41J 2/18; B41J 29/377; B41J 2002/14306;
(Continued)

(56) References Cited

U.S. PATENT DOCUMENTS

2014/0063138 A1 3/2014 Takahagi et al.
2015/0077473 A1 3/2015 Wanibe et al.
(Continued)

FOREIGN PATENT DOCUMENTS

CN 211684118 U 10/2020
EP 3162572 A1 5/2017
(Continued)

OTHER PUBLICATIONS

Decision to Grant a Patent dated Jun. 10, 2025, issued in corresponding Japanese Patent Application No. 2021-156146, 5 pages.
(Continued)

*Primary Examiner* — Bradley W Thies
(74) *Attorney, Agent, or Firm* — Rimon P.C.

(57) ABSTRACT

An inkjet head includes an ejector unit that ejects ink in accordance with a driving signal and a drive substrate unit that outputs the driving signal. The ejector unit includes a base plate, an internal tank temporarily storing the ink ejected from an ejection outlet, a feed ink line that passes the ink supplied to the internal tank, and a first opening. The first opening is formed in an exposed portion of the base plate and communicates to the internal tank. The feed ink line is connected to the first opening at the end on one side in the axial direction and extends toward the other side in the axial direction along the side wall of the case. The end of the
(Continued)

feed-side ink line on the other side in the axial direction is located on the side closer to the other side than the top plate of the case.

8 Claims, 11 Drawing Sheets

(51) Int. Cl.
*B41J 2/18* (2006.01)
*B41J 29/377* (2006.01)

(52) U.S. Cl.
CPC .... *B41J 29/377* (2013.01); *B41J 2002/14306* (2013.01); *B41J 2002/14491* (2013.01)

(58) Field of Classification Search
CPC .......... B41J 2002/14491; B41J 2202/10; B41J 2202/12; B41J 2002/14362; B41J 2202/08; B41J 2/01; B41J 2/14209; B41J 29/02; B41J 2/14
See application file for complete search history.

(56) References Cited

U.S. PATENT DOCUMENTS

| | | | | |
|---|---|---|---|---|
| 2015/0258781 | A1* | 9/2015 | Domae | B41J 2/04581 347/10 |
| 2019/0009536 | A1 | 1/2019 | Hamano et al. | |
| 2019/0315138 | A1 | 10/2019 | Iijima et al. | |
| 2020/0101734 | A1 | 4/2020 | Hagiwara et al. | |
| 2022/0032643 | A1 | 2/2022 | Eto | |

FOREIGN PATENT DOCUMENTS

| | | | | |
|---|---|---|---|---|
| JP | 2010208149 | A * | 9/2010 | B41J 2/14209 |
| JP | 2013-240977 | A | 12/2013 | |
| JP | 2014-061704 | A | 4/2014 | |
| JP | 2015-171806 | A | 10/2015 | |
| JP | 2017-081049 | A | 5/2017 | |
| JP | 2018-144419 | A | 9/2018 | |
| JP | 2019-014195 | A | 1/2019 | |
| JP | 2019-181855 | A | 10/2019 | |
| JP | 2020-049873 | A | 4/2020 | |
| JP | 2020-075390 | A | 5/2020 | |
| WO | 2020/059658 | A1 | 3/2020 | |

OTHER PUBLICATIONS

International Search Report dated Oct. 11, 2022 issued in International Patent Application No. PCT/JP2022/028395, with English translation.

Extended European Search Report dated Jul. 14, 2025, issued in corresponding European Patent Application No. 22872536.2, 9 pages.

* cited by examiner

INK SUPPLY STRUCTURE FOR INKJET HEAD

This application is the U.S. National Phase under 35 U.S.C. § 371 of International Patent Application No. PCT/JP2022/028395, filed on Jul. 21, 2022, which in turn claims the benefit of Japanese Patent Application No. 2021-156146, filed on Sep. 24, 2021, the entire disclosures of which Applications are incorporated by reference herein.

TECHNICAL FIELD

The present invention relates to an inkjet head for performing printing by ejecting ink onto a printing medium.

BACKGROUND ART

There are known to be inkjet printing devices that print characters or images on a printing medium being transported in a predetermined direction, by ejecting ink from ejection outlets onto the printing medium. Such printing devices include an ejector that ejects ink from ejection outlets. The ejector includes therein an internal tank that temporarily stores the ink and an ink flow path that connects the internal tank to an external device outside the ejector. For example, the recording device (1) disclosed in Patent Literature (PTL) 1 is configured such that an ejector housing unit (20) that houses recording heads (7) capable of ejecting ink includes an ink flow path (46) (liquid flow path) that connects an ink cartridge (liquid housing unit) to the recording heads 7 capable of ejecting ink (liquid).

CITATION LIST

Patent Literature

PTL 1: Japanese Patent Application Laid-Open No. 2017-081049

SUMMARY OF INVENTION

Technical Problem

In the recording device (1) disclosed in PTL 1, the ink flow path (46) formed in the ejector housing unit (20) opens to the side wall of the ejector housing unit (20). Thus, when the ink cartridge is replenished with ink supplied from an external ink supplier, lines or the like extending from the ink supplier have to be connected to the opening of the ink flow path 46 formed in the side wall of the ejector holder (20). Thus, an operator has to perform this connection operation on the lateral side of the ejector housing unit (20) where there is a limited space. This makes the operation difficult and may result in deterioration of operating efficiency.

The present invention has been made in light of such circumstances, and it is an object of the present invention to provide a technique that enables easily establishing connection between an ejector and a line extending from an external ink supplier in the case of supplying ink to the internal tank that is located inside the ejector and temporarily stores the ink.

Solution to Problem

To solve the problem described above, a first aspect of the present application is an inkjet head for performing printing on a printing medium by ejecting ink onto the printing medium. The inkjet head includes an ejector unit that ejects the ink in accordance with a driving signal, and a drive substrate unit that supplies the driving signal to the ejector unit. The ejector unit includes a base plate, an ejector that ejects the ink from an ejection outlet to the base plate, the ejector being arranged in the base plate, and an ejector-side connector that receives the driving signal. The drive substrate unit includes a drive substrate that generates the driving signal, a drive-substrate-side connector that outputs the driving signal, and a case that holds the drive substrate and the drive-substrate-side connector. The drive substrate unit is detachable from the ejector unit in an axial direction orthogonal to the base plate. When the case is mounted on the ejector unit, the drive-substrate-side connector and the ejector-side connector are connected to each other and form an exposed portion that exposes part of the base plate. The ejector includes an internal tank that temporarily stores the ink ejected from the ejection outlet. The ejector unit further includes a feed ink line that passes the ink supplied to the internal tank, and a first opening formed in the exposed portion and communicating to the internal tank. The case includes a side wall that expands into a cylinder shape in the axial direction, and a top plate that covers an end of the side wall on one side in the axial direction, the end being away from the base plate. The feed ink line is connected to the first opening at an end on the other side in the axial direction opposite to the one side in the axial direction and extends toward the one side along the side wall, and the end on the one side in the axial direction is located on a side closer to the one side than the top plate.

A second aspect of the present application is the inkjet head according to the first aspect, in which the drive substrate unit further includes a locking member fixedly attached to the side wall of the case, the locking member detachably locking an intermediate portion of the feed ink line in the axial direction.

A third aspect of the present application is the inkjet head according to the first or second aspect, in which the ejector unit further includes an exhaust ink line that passes the ink exhausted from the internal tank, and a second opening formed in the exposed portion and communicating to the internal tank, and the exhaust ink line is connected to the second opening at an end on the other side in the axial direction and extends toward the one side along the side wall.

A fourth aspect of the present application is the inkjet head according to the third aspect, in which the internal tank includes a first internal tank on an ink feed side and a second internal tank on an ink exhaust side, the first internal tank communicates to the ejection outlet and the first opening, and the second internal tank communicates to the ejection outlet and the second opening.

A fifth aspect of the present application is the inkjet head according to the third or fourth aspect, in which the drive substrate unit further includes a cooling jacket that cools the drive substrate by passing a cooling medium therein, the cooling jacket being arranged between the drive substrate and an inner surface of the case, a feed cooling line that passes the cooling medium supplied to the cooling jacket, and a connection port formed in the side wall and connected to the cooling jacket, the feed cooling line is connected to the connection port at an end on the other side and extends toward the one side along the side wall, and when the ejector unit and the drive substrate unit are mounted on each other, the connection port is separated from the first opening and the second opening in the axial direction.

Advantageous Effects of Invention

According to the first to fifth aspects of the present application, the end of the feed ink line on one side in the axial direction is located on the side closer to the one side in the axial direction than the top plate of the case, the feed-side ink line communicating to the internal tank for temporality storing the ink. Accordingly, the operator is able to conduct the operation of connecting the feed ink line to a line extending from an external ink supplier on the side closer to the one side in the axial direction than the case. As a result, the operator is able to conduct this connection operation without accessing the lateral side of the case where there is only a limited space. This improves operating efficiency.

According to the second aspect of the present application, since the feed ink line is locked to the side wall of the case, it is possible to reduce the occurrence of bend in the feed ink line or entanglement of the feed ink line.

According to the fifth aspect of the present application, it is possible to avoid interaction between the temperature of the cooling medium passing through the feed cooling line and the temperature of the ink passing through the exhaust ink line.

DESCRIPTION OF EMBODIMENT

Hereinafter, an embodiment of the present invention will be described with reference to the drawings. Note that constituent elements described in the embodiment are merely examples and do not intend to limit the scope of the present invention to the embodiment. To facilitate understanding of the drawings, the dimensions and number of each component may be shown in an exaggerated or simplified manner as necessary.

1. First Embodiment

1-1. Configuration of Printing Device

Figure 1:
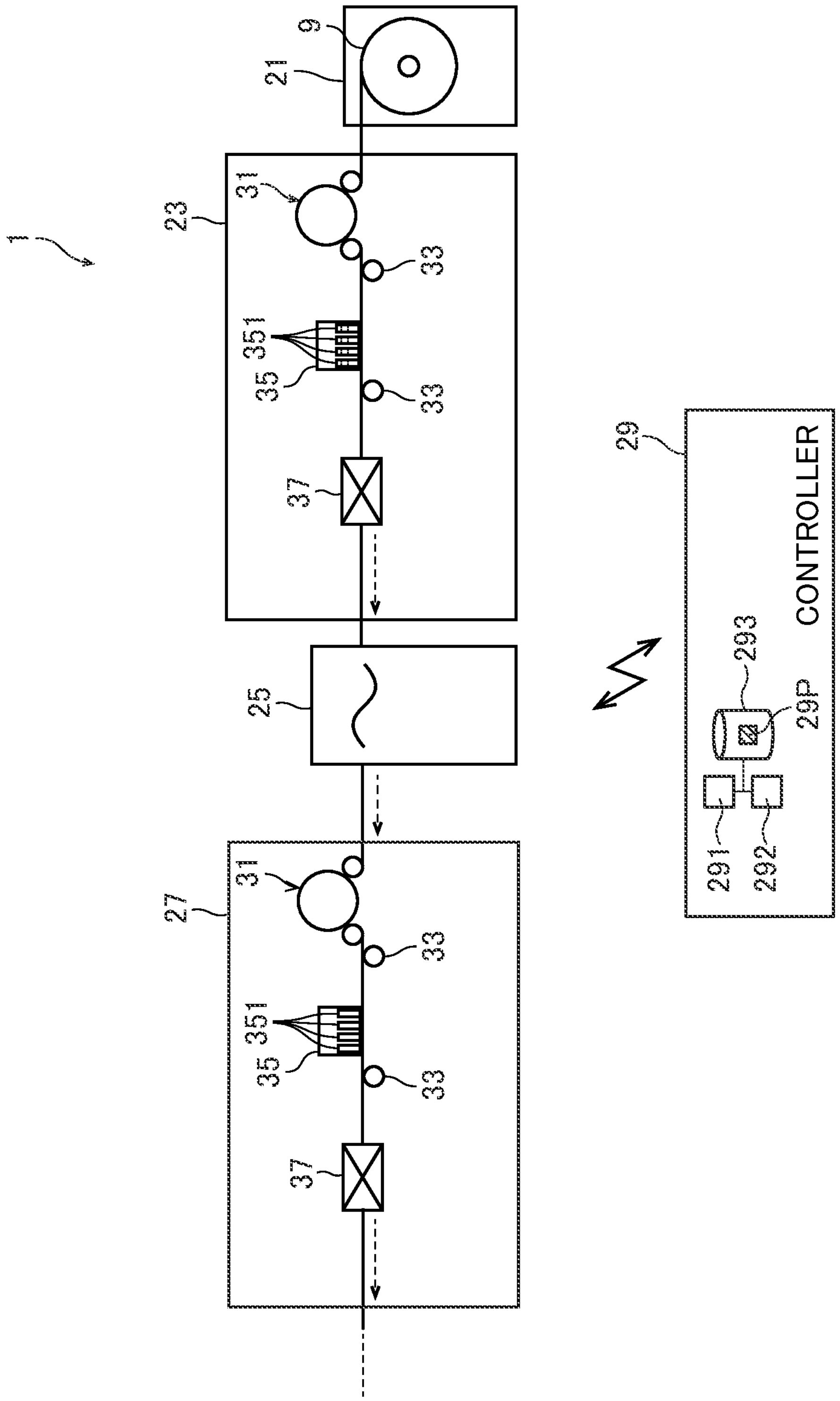
FIG. 1 is a diagram schematically showing a configuration of a printing device.

FIG. 1 is a diagram schematically showing a configuration of a printing device 1 according to one embodiment of the present invention. Note that ink feeders 28, which will be described later, are not shown in FIG. 1. The printing device 1 is a continuous-form inkjet printing machine that records characters or images on the surface of long band-like continuous forms paper 9 by ejecting ink droplets from a plurality of inkjet heads 351 onto the continuous forms paper 9 while transporting the continuous forms paper 9. The long band-like continuous forms paper 9 is one example of a printing medium. The printing medium may be a plastic film or any other film. The printing medium may also be corrugated cardboard, metal leaf, or a base material made of glass.

The printing device 1 includes a paper feeder 21, a surface printing unit 23, a turnover unit 25, a reverse printing unit 27, a plurality of (in the present embodiment, eight) ink feeders 28, and a controller 29.

The paper feeder 21 supplies the continuous forms paper 9 to the surface printing unit 23. The paper feeder 21 rotatably holds a roll of continuous forms paper 9 around a horizontal axis. The paper feeder 21 feeds the continuous forms paper 9 to the surface printing unit 23 by rotating the roll of continuous forms paper 9.

The surface printing unit 23 is a device that performs printing on one of main surfaces (largest surfaces) on both sides of the continuous forms paper 9 while transporting the continuous forms paper 9 in a transport direction indicated by arrows with broken lines in FIG. 1. The surface printing unit 23 includes a driver 31, a plurality of transport rollers 33, a printer 35, and a dryer 37. Hereinafter, the downstream side in the transport direction is simply referred to as "downstream." Note that the number and arrangement of transport rollers 33 in FIG. 1 are merely one example. That is, although the two transport rollers 33 are shown in each of the printing units 23 and 27 in FIG. 1, the number of transport rollers 33 may be greater than or smaller than two.

The driver 31 takes the continuous forms paper 9 into the surface printing unit 23 from the paper feeder 21. For example, the driver 31 may be configured by a plurality of rollers. The transport rollers 33 are located downstream of the driver 31. The continuous forms paper 9 is transported in the transport direction by the driver 31 while being supported by the transport rollers 33.

The printer 35 is located downstream of the driver 31. The printer 35 includes a plurality of (in the present embodiment, four) inkjet heads 351. The four inkjet heads 351 each eject ink droplets to the main surface of the continuous forms paper 9. The four inkjet heads 351 are aligned at intervals in the transport direction. In the present embodiment, the four inkjet heads 351 eject ink of different colors. For example, the four inkjet heads 351 according to the present embodiment may eject cyan ink, magenta ink, yellow ink, and black ink, respectively. A detailed structure of the inkjet heads 351 will be described later.

The dryer 37 is located downstream of the printer 35. The dryer 37 dries the ink applied onto the continuous forms paper 9 by the printer 35. For example, the dryer 37 may raise the temperature of the continuous forms paper 9 or the temperature around the continuous forms paper 9 by blowing hot air onto the continuous forms paper 9 or applying radiant heat generated from a heat source such as an electric heater to the continuous forms paper 9. The dryer 37 may further include, for example, a heat roller. The temperature of the continuous forms paper 9 may be raised by bringing the heat roller into contact with the continuous forms paper 9.

The turnover unit 25 turns over the continuous forms paper 9 that is fed out from the surface printing unit 23. The continuous forms paper 9 that is turned over by the turnover unit 25 is further transported to the reverse printing unit 27.

The reverse printing unit 27 performs printing on the other main surface of the continuous forms paper 9 that is turned over by the turnover unit 25. The reverse printing unit 27 is similar in configuration to the surface printing unit 23, and thus a redundant description thereof shall be omitted. The continuous forms paper 9 that has undergone the stage of the reverse printing unit 27 is further transported to the downstream side and, for example, may be rolled and collected around a horizontal axis by a collector (not shown).

Next, the ink feeders 28 will be described. Each ink feeder 28 supplies the temperature-controlled ink to the inkjet heads 351 while circulating the ink among the inkjet heads 351. The printing device 1 according to the present embodiment includes the eight ink feeders 28 in total, including four ink feeders 28 that correspond respectively to the four inkjet heads 351 of the surface printing unit 23 and four ink feeders 28 that correspond respectively to the four inkjet heads 351 of the reverse printing unit 27. The eight ink feeders 28 are equal in structure, and thus the structure of only one ink feeder 28 will be described below.

Figure 2:
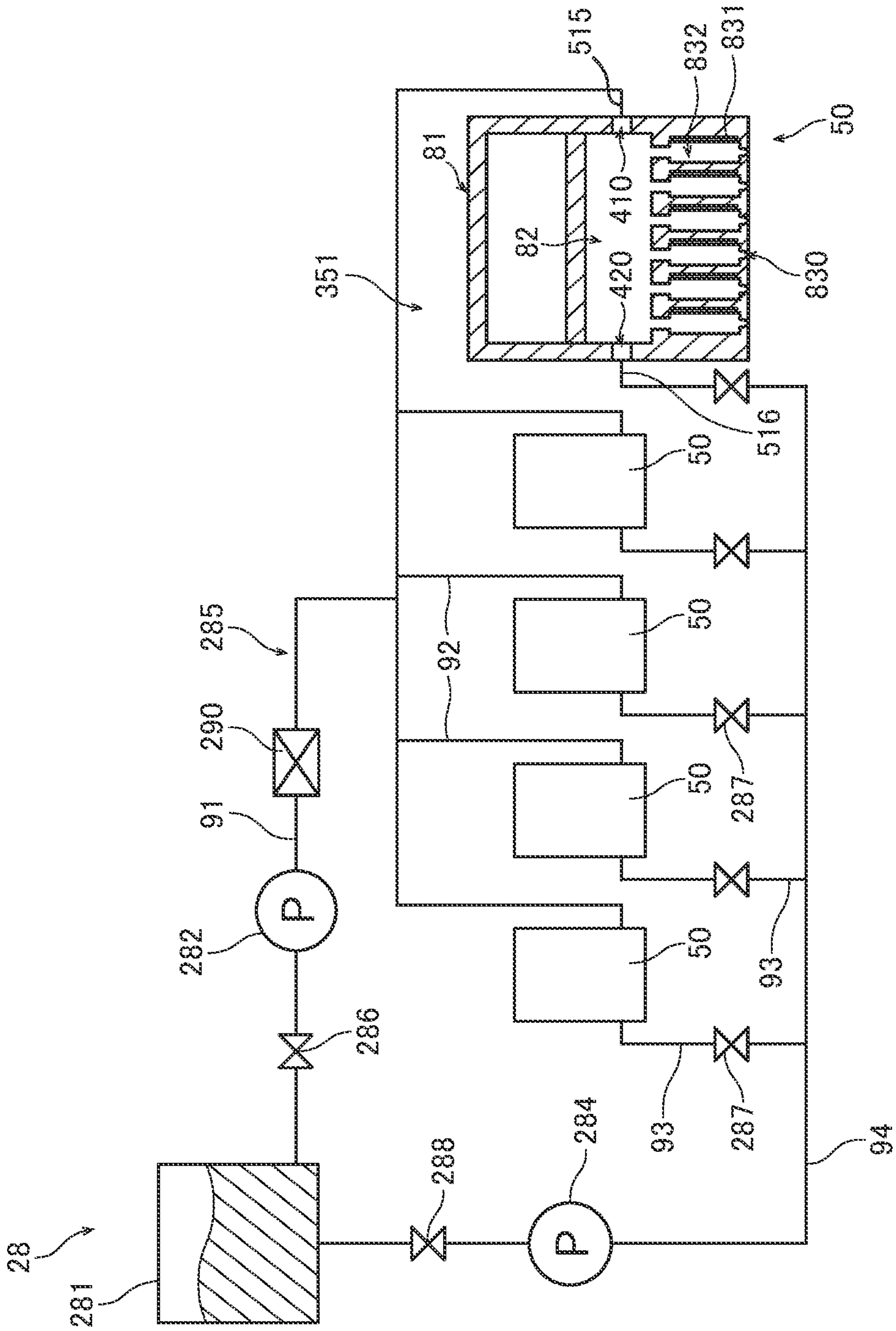
FIG. 2 is a diagram schematically showing a configuration of an ink feeder and an inkjet head.

FIG. 2 is a diagram schematically showing configurations of one ink feeder 28 and one inkjet head 351. Each inkjet head 351 includes a plurality of (in the present embodiment, five) head assemblies 50. The five head assemblies 50 are equal in structure, and thus four of the five head assemblies 50 are shown in a more simplified manner in FIG. 2. As shown in FIG. 2, the ink feeder 28 includes a reservoir tank 281, a feed pump 282, a reflux pump 284, and a line 285. The line 285 includes a first supply line 91, a plurality of (in the present embodiment, five) second supply lines 92, a plurality of (in the present embodiment, five) first reflux lines 93, and a second reflux line 94.

The reservoir tank 281 is a container for storing ink. The reservoir tank 281 is provided with a temperature control mechanism (not shown) for controlling the temperature of the stored ink. The first supply line 91 and the five second supply lines 92 are lines that connect the reservoir tank 281 and the head assemblies 50. That is, the reservoir tank 281 is connected to the head assemblies 50 via the first supply line 91 and the second supply lines 92. One end of the first supply line 91 is communicably connected to the interior of the reservoir tank 281 in the vicinity of the lower end of the reservoir tank 281. The other end of the first supply line 91 is communicably connected to one end of the five second supply lines 92.

The first supply line 91 has inserted therein a first on-off valve 286, the feed pump 282, and a filter 290. The first on-off valve 286 is arranged between the reservoir tank 281 and the feed pump 282. The filter 290 is arranged between the feed pump 282 and the other end of the first supply line 91. It is, however, noted that the position of the filter 290 is not limited to this example.

The feed pump 282 is liquid transmission means for sending out the ink from the reservoir tank 281 to each head assembly 50. The feed pump 282 generates a flow of the ink from the reservoir tank 281 to each head assembly 50 inside the first supply line 91 in accordance with an actuating signal received from the controller 29. Accordingly, the temperature-controlled ink stored in the reservoir tank 281 is supplied through the first supply line 91 and the second supply lines 92 to the head assemblies 50.

When the first on-off valve 286 is in closed position, communication to the first supply line 91 is closed off. That is, when the on-off valve 286 is in closed position, communication between the reservoir tank 281 and each head assembly 50 is closed off. When the first on-off valve 286 is in open position, on the other hand, communication to the first supply line 91 is ensured. When the printing device 1 is in operation, the first on-off valve 286 is usually in open position.

The filter 290 removes solid components or foreign materials in the ink passing through the interior of the first supply line 91. This suppresses the mixing of solid components or foreign materials in the ink supplied to each head assembly 50.

The other end of each of the five second supply lines 92 is communicably connected to one end of a feed ink line 515 (described later) of the corresponding head assembly 50. The other end of the feed ink line 515 is communicably connected to a first opening 410 of the head assembly 50 in communication with an internal tank 82. The first opening 410 is an opening for supplying the ink to nozzles 83 via the internal tank 82. Accordingly, the ink stored in the reservoir tank 281 is supplied through the first supply line 91, the second supply line 92, the feed ink line 515, and the first opening 410 to the internal tank 82 of each head assembly 50.

Note that each head assembly 50 is provided with a liquid-level sensor (not shown). The liquid-level sensor is a sensor that detects the liquid level of the ink stored in the internal tank 82. The controller 29 detects the liquid level of the ink stored in the internal tank 82 in accordance with a signal received from the liquid-level sensor and determines whether to supply the ink to the internal tank 82. When the ink is supplied from the reservoir tank 281 to the internal tank 82, the controller 29 brings the first on-off valve 286 into open position to activate the feed pump 282. In the case of stopping the supply of the ink from the reservoir tank 281 to the internal tank 82, the controller 29 stops the feed pump 282 and brings the first on-off valve 286 into closed position.

The five first reflux lines 93 and the second reflux line 94 are lines that connect each head assembly 50 and the reservoir tank 281. One end of each of the five first reflux lines 93 is communicably connected to one end of an exhaust ink line 516 (described later) of the corresponding head assembly 50. The other end of the exhaust ink line 516 is communicably connected to a second opening 420 that is in communication with the internal tank 82 of the head assembly 50. The other end of each of the five first reflux lines 93 is communicably connected to one end of the second reflux line 94. The other end of the second reflux line 94 is communicably connected to the interior of the reservoir tank 281.

Each first reflux line 93 has inserted therein a second on-off valve 287. When the second on-off valve 287 is in closed position, communication to the first reflux line 93 in which the second on-off valve 287 is inserted is closed off. That is, when the second on-off valve 287 is in closed position, communication between the internal tank 82 of the corresponding head assembly 50 and the second reflux line 94 is closed off. When the second on-off valve 287 is in open position, on the other hand, communication to the first reflux line 93 in which the second on-off valve 287 is inserted is ensured. That is, when the second on-off valve 287 is in open position, communication between the internal tank 82 of the corresponding head assembly 50 and the second reflux line 94 is ensured.

The second reflux line 94 has inserted therein the reflux pump 284 and a third on-off valve 288. The reflux pump 284 is liquid transmission means for sending out the ink from the internal tank 82 of each head assembly 50 to the reservoir tank 281. The reflux pump 284 generates a flow of the ink from each first reflux line 93 to the reservoir tank 281 inside the second reflux line 94 in accordance with an actuating signal received from the controller 29. Accordingly, the ink stored in the internal tank 82 of each head assembly 50 is returned through the second opening 420, the exhaust ink line 516, the first reflux line 93, and the second reflux line 94 to the reservoir tank 281. The ink stored in the internal tank 82 as used herein refers to ink that has a lowered temperature after accumulated in the internal tank 82 without being ejected. Accordingly, the features such as temperature and viscosity of the ink stored in the internal tank 82 of the head assembly 50 are maintained within appropriate ranges. As a result, it is possible to avoid degradation of the ink ejected from each head assembly 50 and to improve print quality.

The third on-off valve 288 is arranged between the reflux pump 284 and the reservoir tank 281. When the third on-off valve 288 is in closed position, communication to the second reflux line 94 is closed off. That is, when the third on-off valve 288 is in closed position, communication between each first reflux line 93 and the reservoir tank 281 is closed off. When the third on-off valve 288 is in open position, on the other hand, communication to the second reflux line 94 is ensured. The third on-off valve 288 is in open position when the reflux pump 284 is actuated to return the ink from each head assembly 50 to the reservoir tank 281.

In the present embodiment, the second on-off valve 287 provided in each first reflux line 93 as described above allows a back flow of the ink from each individual head assembly 50. For example, when the ink is returned from some of the head assemblies 50 to the reservoir tank 281, the third on-off valve 288 and the second on-off valves 287 corresponding to the target head assemblies 50 are brought into open position and the other second on-off valves 287 are left in closed position: in this condition, the reflux pump 284 is activated.

Figure 3:
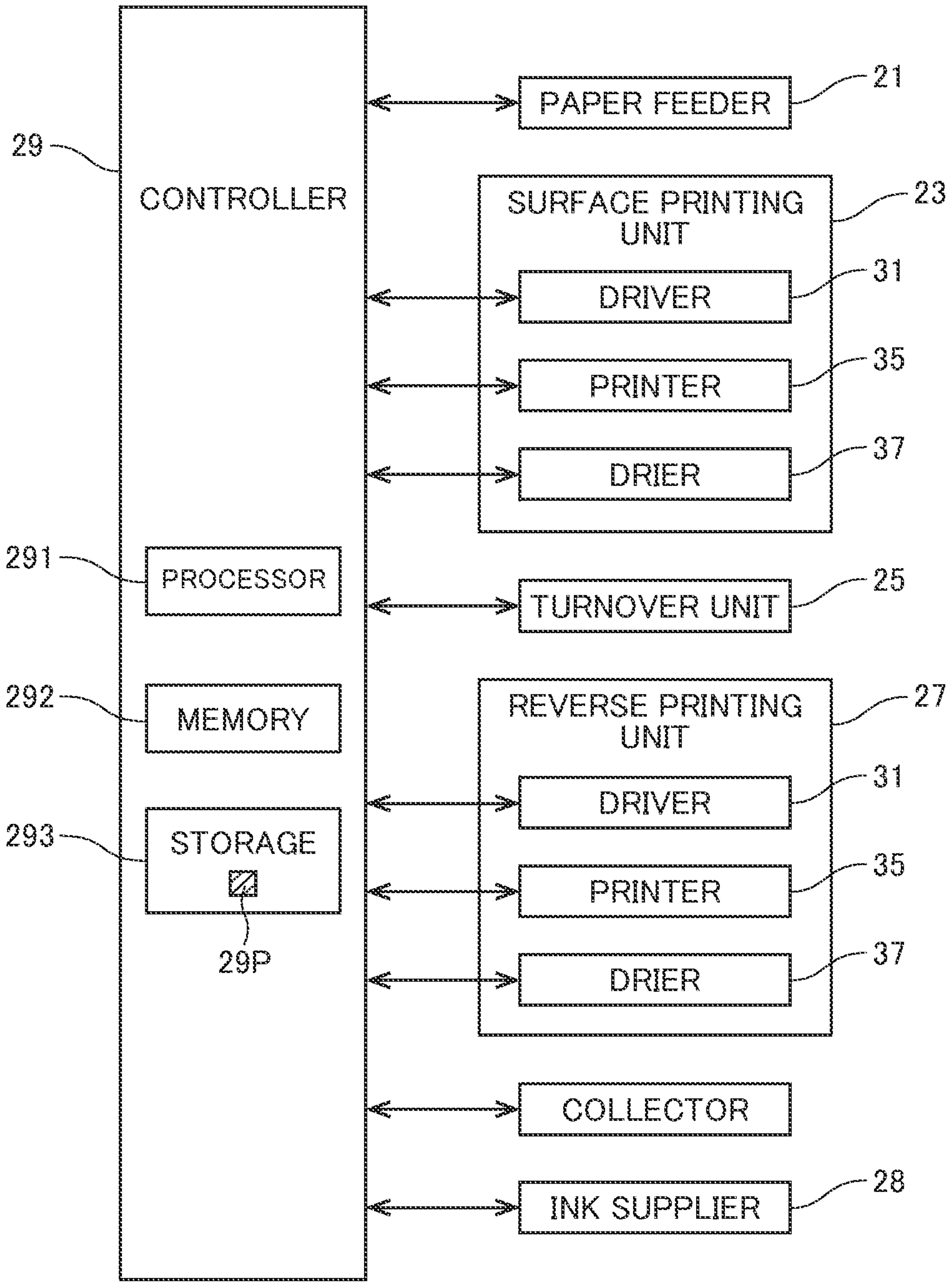
FIG. 3 is a block diagram showing connection between a controller and each component of the printing device.

Next, the controller 29 is described. The controller 29 is an information processing device for controlling the printing device 1. FIG. 3 is a block diagram showing connection between the controller 29 and each component of the printing device 1. As schematically shown in FIG. 3, the controller 29 includes a processor 291 such as a CPU, memory 292 such as a RAM, and a storage 293 such as a hard disk drive (HDD). The storage 293 stores a computer program 29P for performing print processing while transporting the continuous forms paper 9 and for supplying ink to the inkjet heads 351.

As shown in FIG. 3, the controller 29 is communicably connected to the paper feeder 21: the driver 31, the four inkjet heads 351 of the printer 35, and the dryer 37 of the surface printing unit 23: the turnover unit 25: the driver 31, the four inkjet heads 351 of the printer 35, and the dryer 37 of the reverse printing unit 27; the collector; and the eight ink feeders 28. The controller 29 controls operations of these components in accordance with the computer program 29P. This advances the transport of the continuous forms paper 9 and the printing processing and allows the circulation of ink between the reservoir tank 281 and the inkjet head 351. As a result, the temperature-controlled ink is supplied to the internal tank 82.

1-2. Detailed Structure of Inkjet Head

Next, a detailed structure of the inkjet heads 351 will be described. The inkjet heads 351 are processing units that performs printing on the continuous forms paper 9 being transported, by ejecting ink droplets onto the continuous forms paper 9. As described above, the printing device 1 includes eight inkjet heads 351. The eight inkjet heads 351 are equal in structure, and thus the structure of only one of the inkjet heads 351 will be described below.

Hereinafter, the direction along the length of a base plate 511 that expands into a plate shape, which will be described later, is referred to as the "X direction," the direction along the width of the base plate 511 is referred to as the "Y direction," and the direction orthogonal to the base plate 511 is referred to the "axial direction." For the sake of convenience of description, hereinafter, the axial direction is referred to as the "up-down direction," and the shape and positional relationship of each component is described on the assumption that a drive substrate unit 52 to be mounted on an ejector unit 51, which will be described later, is located on the upper side of the ejector unit 51. It is, however, noted that this definition of the up-down direction does not intend to limit the postures of the inkjet heads 351 during manufacture and use according to the present invention. That is, the "upper side" may be paraphrased as "one side in the axial direction," and the "lower side" may be paraphrased as the "other side in the axial direction." In the following description, a "parallel direction" also includes "approximately parallel directions." An "orthogonal direction" also includes "approximately orthogonal directions."

Figure 4:
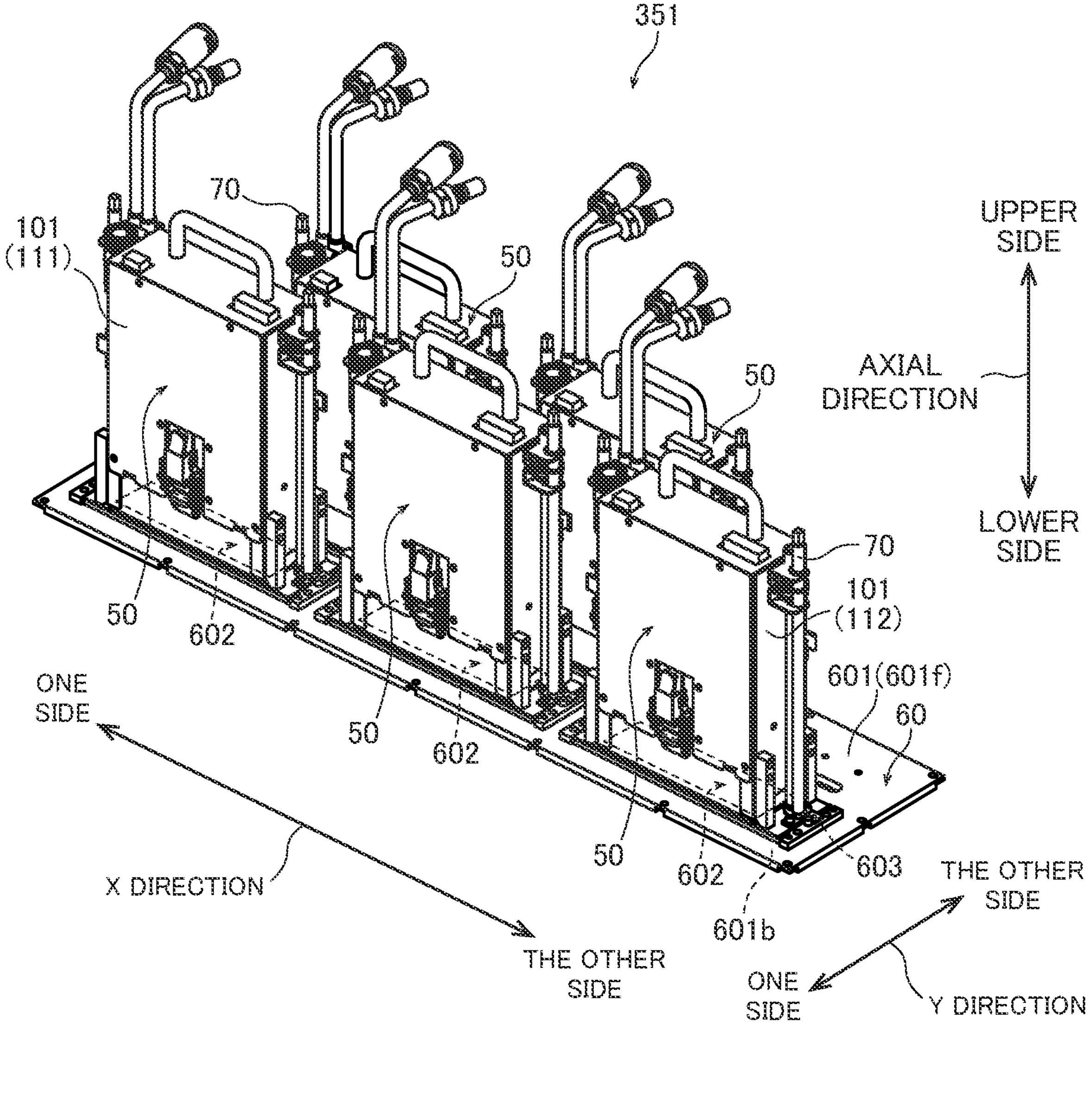
FIG. 4 is a perspective view of the inkjet head.

FIG. 4 is a perspective view of one inkjet head 351. As shown in FIG. 4, each inkjet head 351 includes a plurality of (in the present embodiment, five) head assemblies 50, one head mounting unit 60, and a plurality of (in the present embodiment, ten) rod-like coupling members 70.

Figure 5:
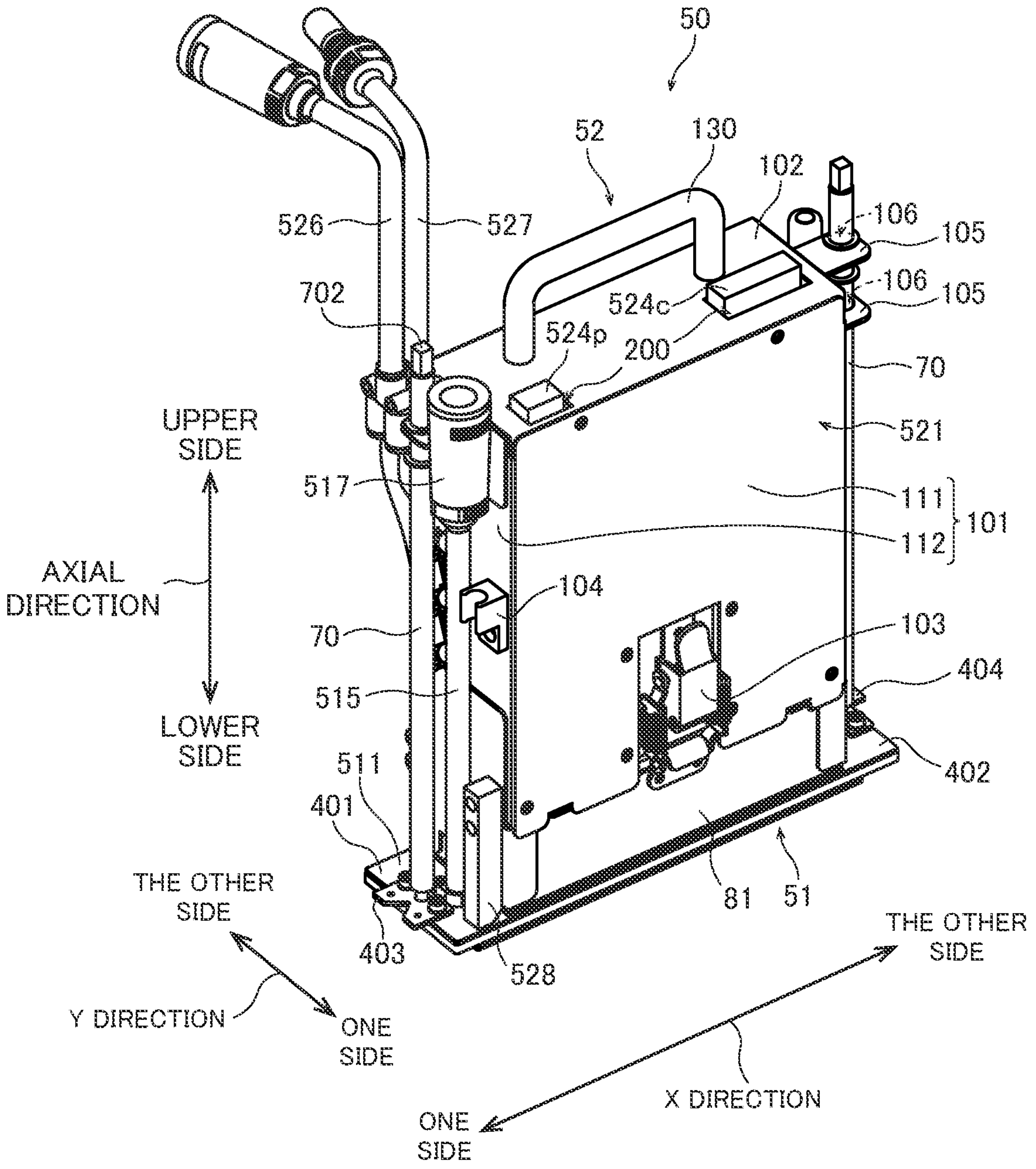
FIG. 5 is a perspective view of a head assembly and a coupling member.
Figure 6:
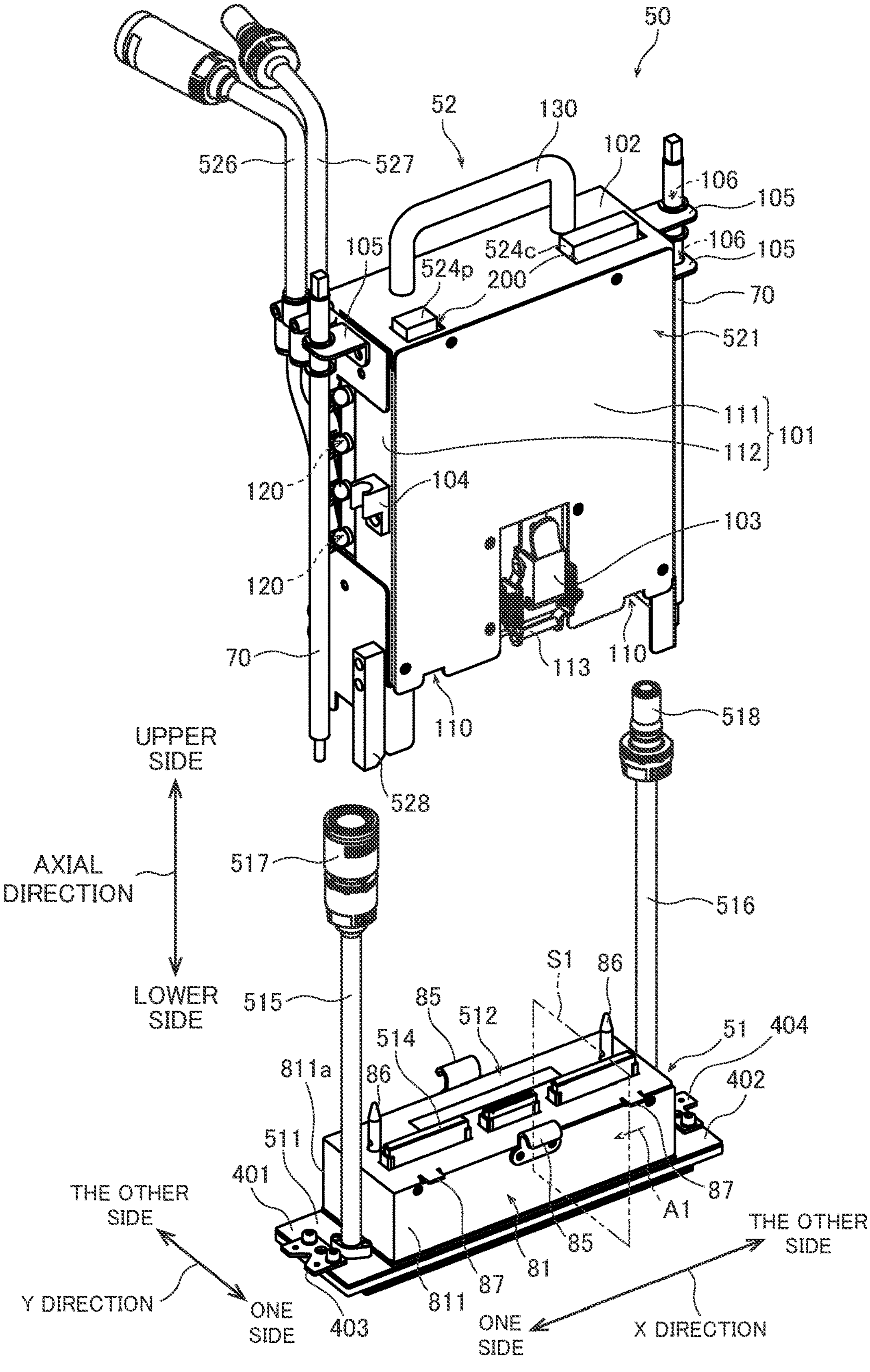
FIG. 6 is an exploded perspective view of the head assembly and the coupling member.

FIG. 5 is a perspective view of one head assembly 50 and two coupling members 70. FIG. 6 is an exploded perspective view of the one head assembly 50 and the two coupling members 70. As shown in FIGS. 5 and 6, the head assembly 50 includes the ejector unit 51 and the drive substrate unit 52. The head assembly 50 is configured by mounting the ejector unit 51 and the drive substrate unit 52 on each other.

Figure 7:
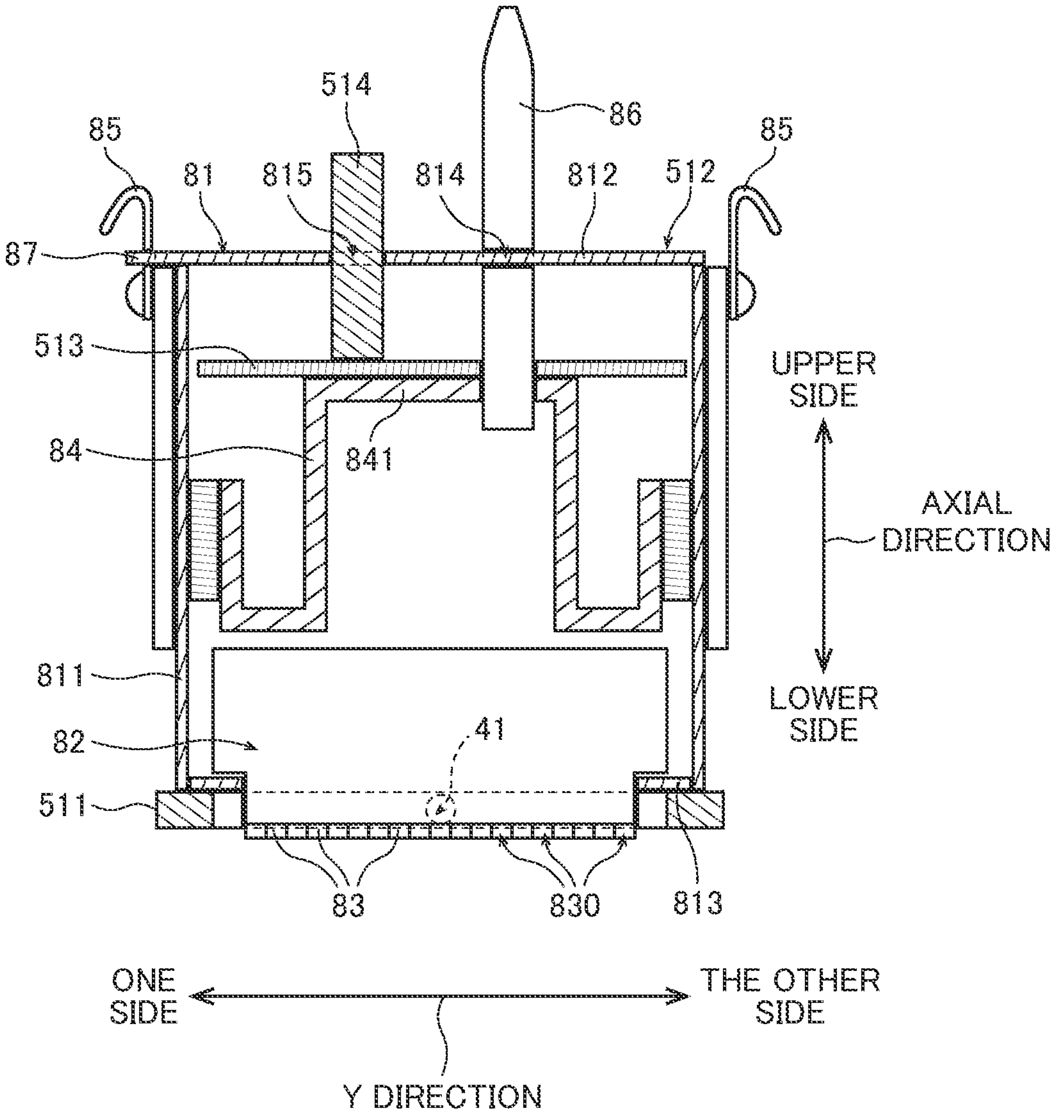
FIG. 7 is a longitudinal sectional view of an ejector unit.

The ejector unit 51 ejects ink in accordance with a driving signal described later. FIG. 7 is a longitudinal sectional view of the ejector unit 51 in FIG. 6 that is cut along a plane S1 in FIG. 6 when viewed in a direction indicated by an arrow A1. As shown in FIGS. 6 and 7, the ejector unit 51 includes the base plate 511, an ejector 512, an adaptor substrate 513, an ejector-side connector 514, the feed ink line 515, and the exhaust ink line 516. Note that the feed ink line 515 is not shown in FIG. 7.

Figure 8:
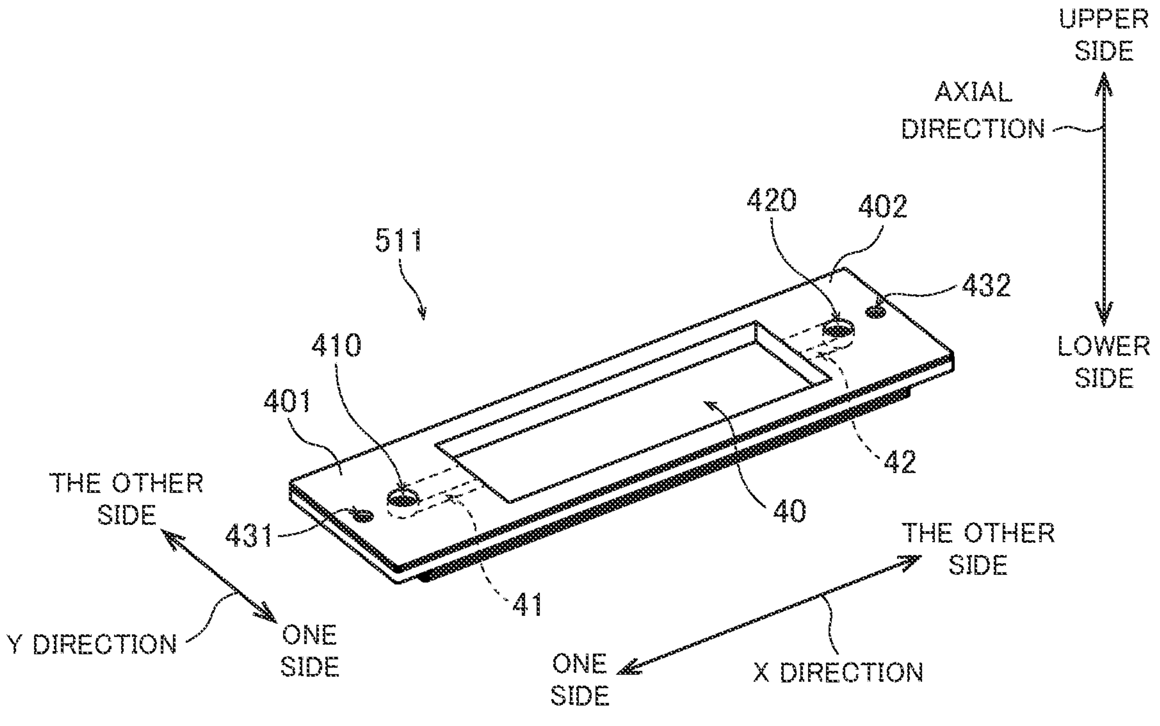
FIG. 8 is a perspective view of a base plate.

The base plate 511 is a plate-like member that expands perpendicularly to the axial direction. FIG. 8 is a perspective view of the base plate 511. As shown in FIG. 8, the base plate 511 includes a base through hole 40, a first communication path 41, a second communication path 42, and two positioning grooves 431 and 432.

The base through hole 40 is a through hole that penetrates a central portion in the X and Y directions of the base plate 511 in the axial direction orthogonal to the base plate 511. On the base plate 511, a head body 81 (described later) of the ejector 512 is placed. With the ejector 512 fixedly mounted on the base plate 511, the bottom of the ejector 512 is located at the level of the base through hole 40. With the ejector 512 fixedly mounted on the base plate 511, portions of the base plate 511 that are located at both ends in the X direction are exposed without being covered with the ejector 512. This forms exposed portions 401 and 402 that expose part of the base plate 511. On the exposed portion 401, a positioning metal fitting 403 is mounted. On the exposed portion 402, a positioning metal fitting 404 is mounted. These positioning metal fittings 403 and 404 are members that fit in pins (not shown) provided in a standing position on the head mounting unit 60, and are used as references when mounting the head assembly 50 on the head mounting unit 60.

The first communication path 41 extends into a cave shape inside the base plate 511 from the base through hole 40 toward one end in the X direction and opens on the surface of the exposed portion 401. This forms a first opening 410 in the surface of the exposed portion 401. The first opening 410 is an opening for supplying ink to the ejector 512. The second communication path 42 extends into a cave shape inside the base plate 511 from the base through hole 40 toward the other end in the X direction and opens on the surface of the exposed portion 402. This forms a second opening 420 in the surface of the exposed portion 402. The first opening 410 and the second opening 420 are each formed in the surface of the base plate 511. Thus, the first opening 410 and the second opening 420 are each located at the same position in the axial direction as the base plate 511.

The positioning groove 431 is a through hole formed by penetrating, in the axial direction, a portion of the exposed portion 401 of the base plate 511 that is located closer to the one side in the X direction than the first opening 410. The positioning groove 432 is a through hole formed by penetrating, in the axial direction, a portion of the exposed portion 402 of the base plate 511 that is located closer to the other side in the X direction than the second opening 420. Alternatively, the two positioning grooves 431 and 432 may be formed by notching parts of the exposed portions 401 and 402.

The ejector 512 is a processing unit that is arranged on the base plate 511 and ejects ink from ejection outlets 830. As shown in FIG. 7, the ejector 512 includes the head body 81, the internal tank 82, a plurality of nozzles 83, a bracket 84, a plurality of (in the present embodiment, two) hooks 85, a plurality of (in the present embodiment, two) first protrusions 86, and a plurality of (in the present embodiment, two) second protrusions 87.

The head body 81 is a hollow box-like case that has a square cylindrical side wall 811, an upper lid 812, and a bottom surface 813. Note that the bottom surface 813 is wide open to the nozzles 83 in the downward direction. Hereinafter, areas of the side wall 811 that bend at a right angle are referred to as a "corners 811*a* (see FIG. 6)." The head body 81 is fixedly mounted on the base plate 511 by, for example, screws (not shown). The head body 81 has arranged therein the internal tank 82 capable of temporarily storing the ink to be ejected through the ejection outlets 830. The first opening 410 of the base plate 511 communicates to the internal tank 82 via the first communication path 41. The second opening 420 communicates to the internal tank 82 via the second communication path 42.

The nozzles 83 are arranged at regular intervals in both of the X and Y directions under the head body 81. Each of the nozzles 83 communicates to the internal tank 82. Each of the nozzles 83 also includes a plurality of piezo actuators 831 (see FIG. 2) serving as pressure developing elements, an ink chamber 832 (see FIG. 2), and an ejection outlet 830. The ink chamber 832 communicates to the internal tank 82. When the ink is ejected, the ink flows down from the internal tank 82 to the ink chamber 832, pressure is applied to the ink stored in the ink chamber 832 by the action of the piezo actuators 831, and the ink is ejected in the form of droplets from the ejection outlet 830. The piezo actuators 831 are controlled, upon receipt of a driving signal, whether to apply pressure to the ink stored in the ink chamber 832. Alternatively, the nozzles 83 may be so-called thermal nozzles that apply pressure to the ink by using an electric heater as a pressure developing element to heat the ink stored in the ink chamber 832 and generate bubbles (air bubbles).

The bracket 84 is further arranged inside the head body 81. For example, the bracket 84 may be fixedly attached to the side wall 811. The bracket 84 has a greater thickness than the head body 81. To be more specific, the thickness of the bracket 84 is greater than the thickness of the upper lid 812 of the head body 81. The bracket 84 includes a placement portion 841. The placement portion 841 expands into a plate shape in parallel with the base plate 511.

The two hooks 85 are each fixedly attached to the side wall 811 of the head body 81. The hooks 85 project upward into an inverted V-shape.

The two first protrusions 86 are each a member that protrudes upward from the head body 81 into a columnar shape in the axial direction. In the present embodiment, the first protrusions 86 are fixedly attached to the bracket 84 and protrude further upward via through holes 814 that penetrate the upper lid 812 of the head body 81. The first protrusions 86 have a frustoconical shape that tapers upwardly. By in this way fixing the first protrusions 86 to the bracket 84 having a greater thickness than the head body 81, the positions and postures of the first protrusions 86 are more stabilized.

The two second protrusions 87 are each a portion that protrudes in the Y direction from the head body 81. The second protrusions 87 according to the present embodiment are formed by the upper lid 812 of the head body 81 protruding in part toward only one side in the Y direction.

The adaptor substrate 513 is arranged on the upper surface of the placement portion 841 of the bracket 84 and fixedly attached to the placement portion 841 by, for example, screws. The adaptor substrate 513 is provided with a processor and memory, which are not shown. The memory stores the serial number of the ejector unit 51 on which the adaptor substrate 513 is mounted, and information on characteristics of the ejector unit 51. These pieces of information are transmitted via the ejector-side connector 514, a drive-substrate-side connector 523 described later, the drive substrate 522, and an external connector 524*c* to the controller 29. The adaptor substrate 513 is also electrically connected to the piezo actuators 831 of the nozzles 83 via lines, which are not shown.

The ejector-side connector 514 is electrically connected to the adaptor substrate 513. Accordingly, the piezo actuators 831 of the nozzles 83 and the ejector-side connector 514 are electrically connected to each other via the adaptor substrate 513. The ejector-side connector 514 protrudes further upward through a through hole 815 that penetrates the upper lid 812 of the head body 81.

The feed ink line 515 is a line that extends in the axial direction on the side closer to the one side in the X direction than the head body 81. With the drive substrate unit 52 mounted on the ejector unit 51, the feed ink line 515 extends upward in the axial direction along and on the side of a narrow-face wall 112 out of a side wall 101 of a case 521 of the drive substrate unit 52, which will be described later. The upper end of the feed ink line 515 in the axial direction is connected to an ink feed connector 517. The ink feed connector 517 is connected to the second supply line 92 of the ink feeder 28. The lower end of the feed ink line 515 in the axial direction on the side opposite to the upper end is connected to the first opening 410 of the base plate 511. When the feed pump 282 of the ink feeder 28 is driven, the ink stored in the reservoir tank 281 is supplied through the first supply line 91, the second supply line 92, the feed ink line 515, the first opening 410, and the first communication path 41 to the internal tank 82.

The exhaust ink line 516 is a line that extends in the axial direction on the side closer to the other side in the X direction than the head body 81. With the drive substrate unit 52 mounted on the ejector unit 51, the exhaust ink line 516 extends upward in the axial direction along and on the side of a narrow-face wall 112 out of the side wall 101 of the case 521 of the drive substrate unit 52, which will be described later. The upper end of the exhaust ink line 516 in the axial direction is connected to an ink exhaust connector 518. The ink exhaust connector 518 is connected to the first reflux line 93 of the ink feeder 28. The lower end of the exhaust ink line 516 in the axial direction on the side opposite to the upper end is connected to the second opening 420 of the base plate 511. When the reflux pump 284 of the ink feeder 28 is driven, the ink stored in the internal tank 82 of each head assembly 50 is returned through the second communication path 42, the second opening 420, the exhaust ink line 516, the first reflux line 93, and the second reflux line 94 to the reservoir tank 281. The ink stored in the internal tank 82 as used herein refers to the ink that has a lowered temperature after accumulated in the internal ink 82 without being ejected.

Note that the upper end of the feed ink line 515 in the axial direction and the upper end of the exhaust ink line 516 in the axial direction are both located upward of a top plate 102 of the case 521, both of which will be described later. This allows the operator to perform the operation of connecting the second supply line 92 to the ink feed connector 517 fixedly connected to the feed ink line 515 and the operation of connecting the first reflux line 93 to the ink exhaust connector 518 fixedly connected to the exhaust ink line 516, at a position above the case 521. As a result, the operator is able to perform these connection operations without accessing the lateral side of the case 521 where there is only a limited space. This improves operating efficiency.

Figure 9:
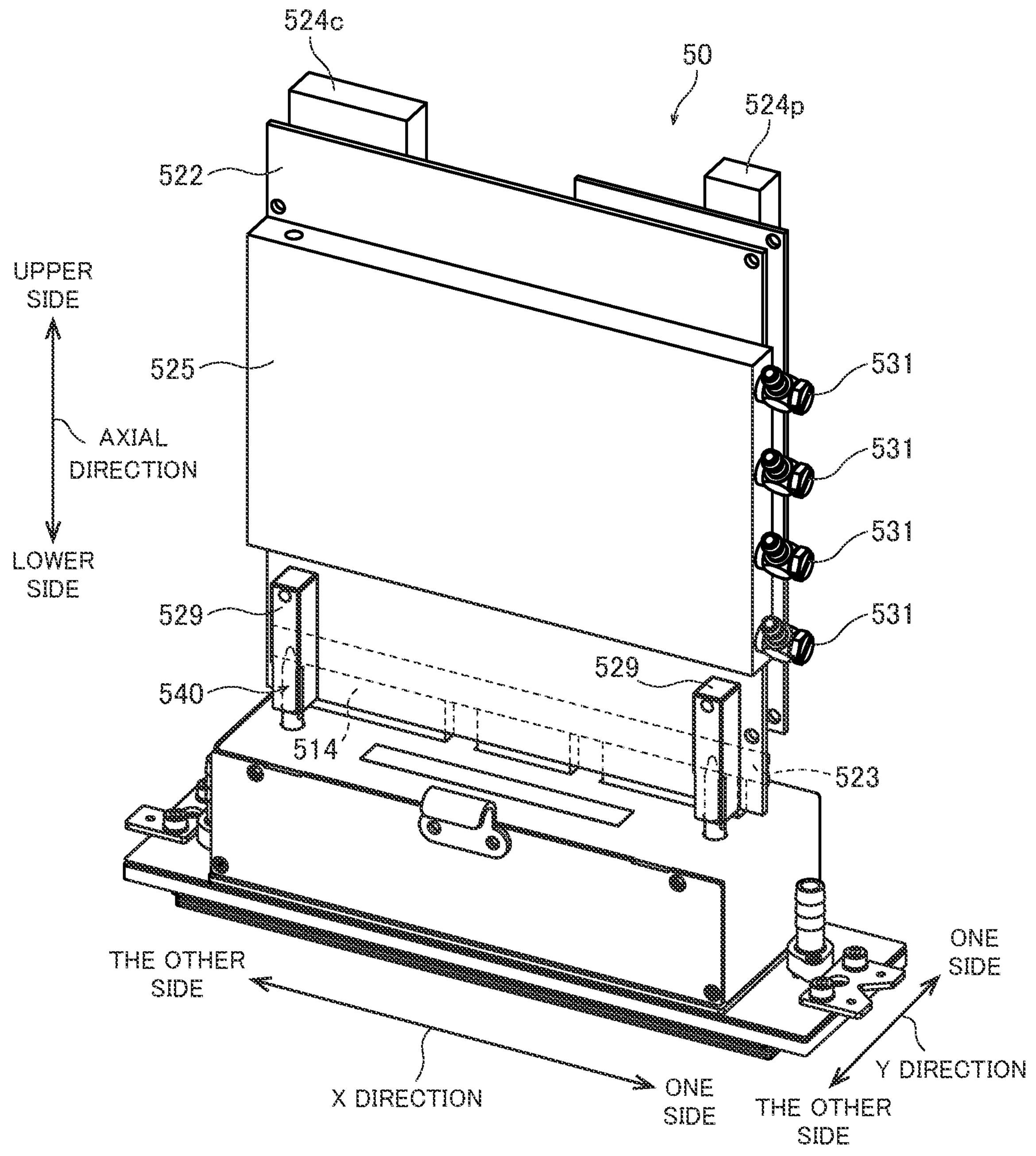
FIG. 9 is a partial perspective view of a head assembly whose interior is exposed in part.

The drive substrate unit 52 is a device that supplies a driving signal to the ejector unit 51. FIG. 9 is a partial perspective view of the head assembly 50 whose interior is exposed in part, when viewed from the other side in the Y direction. As shown in FIGS. 5, 6, and 9, the drive substrate unit 52 includes the case 521, the drive substrate 522, the drive-substrate-side connector 523, external connectors **524*c* and 524*p*, a cooling jacket 525, feed cooling lines 526, exhaust cooling lines 527, a plurality of (in the present embodiment, four) legs 528, and a plurality of (in the present embodiment, two) positioning cylinders 529**.

The case 521 is a hollow member that holds the drive substrate 522, the drive-substrate-side connector 523, the external connectors **524*c* and 524*p*, the cooling jacket 525, and the positioning cylinders 529. The case 521 includes the four side walls 101, the top plate 102, a plurality of (in the present embodiment, two) engaging portions 103, a plurality of (two in the present embodiment) locking members 104, and a plurality of (in the present embodiment, four) support members 105**.

The four side walls 101 extend into a square cylinder shape in the axial direction. The square cylinder configured by the four side walls 101 is slightly larger than a square cylinder configured by the side wall 811 of the head body 81. The top plate 102 covers an opening at the upper end of the square cylinder formed by the four side walls 101. The top plate 102 also has a plurality of (in the present embodiment, two) through holes 200. Each of the two through holes 200 penetrates the top plate 102 in the axial direction. The top plate 102 further has a handle 130 fixedly mounted thereon. The shape of the case 521 is, however, not limited to this shape. The case 521 only needs to have a side wall that expands into a cylinder shape in the axial direction, and a top plate that covers one end of the side wall in the axial direction at an interval from the base plate 511.

The four side walls 101 include a pair of wide-face walls 111 facing each other and a pair of narrow-face walls 112 facing each other. The pair of wide-face walls 111 and the pair of narrow-face walls 112 are adjacent to one another. Each narrow-face wall 112 has a smaller surface area than each wide-face wall 111.

The engaging portions 103 are fixedly attached respectively to the pair of wide-face side walls 111. Each engaging part 103 includes a horizontal engagement bar 113. The engagement bar 113 is located at a variable position in the axial direction. By engaging the engagement bars 113 with the hooks 85 of the ejector unit 51, the case 521 is mounted on the ejector unit 51. Thus, the drive substrate unit 52 including the case 521 is detachable from the ejector unit 51 in the axial direction.

Only one of the four side walls 101 has notches 110. In the present embodiment, out of the pair of wide-face walls 111, only the wide-face wall 111 located on the one side in the Y direction has the notches 110. The notches 110 are obtained by notching the lower end of the wide-face wall 111 in the upward direction. When mounting the case 521 on the ejector unit 51, the operator fits the second protrusions 87 of the ejector unit 51 into the notches 110. If the case 521 is mounted in a wrong orientation relative to the ejector unit 51 and accordingly the second protrusions 87 abut on the side wall 101 that has no notches 110, the case 521 is unable to further move toward the ejector unit 51 and accordingly the case 521 cannot be mounted properly on the ejector unit 51. The configuration described above reduces the possibility that the case 521 may be mounted in a wrong orientation relative to the ejector unit 51 when the drive substrate unit 52 is mounted on the ejector unit 51.

The two locking members 104 are fixedly attached respectively to the pair of narrow-face walls 112. Each of the two locking members 104 has a U-letter shape that is recessed toward the narrow-face wall 112 when viewed in the axial direction. The size of the U-letter shape is approximately equal to the diameter of the feed ink line 515 and the diameter of the exhaust ink line 516. As described above, the feed ink line 515 and the exhaust ink line 516 each extend in the axial direction on the side of the narrow-face wall 112. Thus, when the feed ink line 515 and the exhaust ink line 516 are fitted respectively into the U-letter shapes of the locking members 104, intermediate portions in the axial direction of the feed ink line 515 and the exhaust ink line 516 are locked detachably. This reduces the occurrence of bends in the feed ink line 515 and the exhaust ink line 516 or entanglement thereof with peripheral members.

Two of the support members 105 are further fixedly attached to each of the pair of narrow-face walls 112. In the present embodiment, two support members 105 are fixedly attached to each narrow-face wall 112 at an interval in the axial direction. Each support member 105 protrudes into a plate shape from the narrow-face wall 112 toward the outside in the X direction. Each support member 105 has a support hole 106. The support hole 106 is formed by penetrating the support member 105 in the axial direction. When viewed in the axial direction, the two support holes 106 of the two support members 105 fixedly attached to each narrow-face wall 112 are located at the same position.

As shown in FIG. 6, out of the pair of narrow-face walls 112, only the narrow-face wall 112 located on the one side in the X direction has a plurality of (in the present embodiment, four) through holes 120. In the present embodiment, out of the pair of narrow-face walls 112, only the narrow-face wall 112 to which the feed ink line 515 is locked is provided with the four through holes 120, which are provided at intervals in the axial direction. Each through hole 120 penetrates the narrow-face wall 112 in the thickness direction (X direction). Each through hole 120 is fixedly connected to a joint 531 (see FIG. 9). The joint 531 forms a connection port for connecting a line of the cooling jacket 525, which will be described later. Alternatively, the through holes 120 may be provided in the top plate 102 of the case 521.

The drive substrate 522 is housed in the case 521 and fixedly attached to the side wall 101 of the case 521 by, for example, screws. The lower end portion of the drive substrate 522 is electrically connected to the drive-substrate-side connector 523 via, for example, a flexible flat cable (FFC). Similarly, the upper end portion of the drive substrate 522 is electrically connected to the two external connectors 524*c* and 524*p* via, for example, flexible flat cables (FFCs). The two external connectors 524*c* and 524*p* are respectively exposed to the outside through the through holes 200 provided in the top plate 102 of the case 521.

The external connector 524*p* is connected to a power line that extends from an external power source. Accordingly, electric power for driving the drive substrate 522 and the adaptor substrate 513 and the piezo actuators 831 of the ejector unit 51 is supplied from the external power source. The external connector 524*c* is connected to a communication cable that extends from the controller 29. Accordingly, small dot signals for forming small dots, medium dot signals for forming medium dots, and large dot signals for forming large dots are supplied from the controller 29 via the external connector 524*c* to the drive substrate 522. The drive substrate 522 generates a driving signal from the supplied small, medium, and large dot signals, the driving signal including a driving waveform for driving the piezo actuators 831.

When the case 521 is mounted on the ejector unit 51, the drive-substrate-side connector 523 held in the case 521 and the ejector-side connector 514 of the ejector unit 51 are electrically connected to each other. Accordingly, electric power is supplied from the external power source, and the drive substrate 522 and the adaptor substrate 513 and piezo actuators 831 of the ejector unit 51 are driven. The drive-substrate-side connector 523 outputs a driving signal generated by the drive substrate 522, and the ejector-side connector 514 receives this driving signal. Moreover, the piezo actuators 831 are controlled in accordance with the driving signal. As a result, ink droplets are ejected from the ejection outlets 830 to the continuous forms paper 9, and thereby characters or images are recorded on the surface of the continuous forms paper 9.

As shown in FIG. 9, in the present embodiment, when the ejector unit 51 and the drive substrate unit 52 are mounted on each other, at least part of the drive substrate 522 overlaps the ejector-side connector 514 in the horizontal direction. This configuration achieves downsizing in the axial direction of the head assembly 50 including the ejector unit 51 and the drive substrate unit 52. Therefore, the drive substrate 522 that generates high-temperature heat is located in close proximity to precision elements such as the piezo actuators 831 of the ejector unit 51 and the ink stored in the internal tank 82 of the ejector unit 51.

In view of this, in the present embodiment, the cooling jacket 525 is attached between the drive substrate 522 and the inner surface of the case 521 (to the back surface of the drive substrate 522). The cooling jacket 525 is a known as water cooling device that cools the drive substrate 522 by passing a cooling medium such as cooling water through the interior of lines. In the present embodiment, two lines for circulating the cooling water are arranged in loops on the back surface of the drive substrate 522. This suppresses propagation of the high-temperature heat generated by the drive substrate 522 to the ejector unit 51 or an external atmosphere. As a result, it is possible to suppress heat-induced deterioration and damage of the precision elements such as the piezo actuators 831.

Meanwhile, the cooling jacket 525 itself is arranged apart from the ejector unit 51 in the axial direction. Thus, even if the cooling medium is circulated in the lines of the cooling jacket 525, it is possible to suppress a reduction in the temperature of the ink stored in the internal tank 82. Note that the drive of the cooling jacket 525 may be controlled by an external device (not shown). Alternatively, the drive of the cooling jacket 525 may be controlled by the controller 29.

Both ends of the two lines of the cooling jacket 525 are connected respectively to the connection ports of the four joints 531, which are fixedly attached to the narrow-face wall 112 of the case 521. The connection ports of two joints 531 among the four joints 531 are also connected to the lower ends of the two feed cooling lines 526 extending from an external device. The feed cooling lines 526 are lines for passing the cooling medium supplied to the cooling jacket 525. The connection ports of the remaining two joints 531 among the four joints 531 are also connected to the lower ends of the two exhaust cooling lines 527 extending from an external device. The exhaust cooling lines 527 are lines for passing the cooling medium exhausted from the cooling jacket 525. The two feed cooling lines 526 and the two exhaust cooling lines 527 each extend upward along the narrow-face wall 112. When the cooling jacket 525 is driven, the cooling medium supplied from the external device passes through the feed cooling lines 526, circulates through the lines of the cooling jacket 525, and is exhausted through the exhaust cooling lines 527.

Note that the four joints 531 and their connection ports are located in the vicinity of the top plate 102 of the case 521. In the present embodiment, three joints 531 and their connection ports, among the four joints 531 and their connection ports, are located upward of the center in the axial direction of the case 521. That is, the four joints 531 and their connection ports are located apart from the ejector unit 51 in the axial direction. This further suppresses a reduction in the temperature of the ink stored in the internal tank 82. This further improves workability in the case of connecting the feed cooling lines 526 and the exhaust cooling lines 527 to the connection ports of the four joints 531. It is, however, noted that at least some of the joints 531 and their connection ports may be located upward of the center in the axial direction of the case 521.

With the drive substrate unit 52 mounted on the ejector unit 51, the four joints 531 and their connection ports, to which the ends of the feed cooling lines 526 and the exhaust cooling lines 527 are connected, are spaced in the axial direction from the first opening 410 connected to the feed ink line 515 and the second opening 420 connected to the exhaust ink line 516. This avoids interaction between the temperatures of the feed cooling lines 526 and the exhaust cooling lines 527 and the temperatures of the feed ink line 515 and the exhaust ink line 516. As a result, it is possible to achieve precise temperature control of the drive substrate 522 and the ink stored in the internal tank 82. As described above, the first opening 410 and the second opening 420 are located at the same position in the axial direction as the base plate 511. This allows the ink to be supplied from a position away from the drive substrate 522 to the ejector 512. As a result, it is possible to avoid propagation of the heat generated by the driving substrate 522 to the ink supplied to the ejector 512.

As shown in FIGS. 5 and 6, the outer surface of each of the four side walls 101, which extends into a square cylinder shape, has one leg 528 fixedly attached thereto by, for example, screws. Each of the four legs 528 extends in the axial direction. The lower ends of the four legs 528 are located at the same position in the axial direction.

When mounting the case 521 on the ejector unit 51, the operator firstly moves the drive substrate unit 52 toward the base plate 511 while grasping the handle 130 of the case 521 so that the head body 81 is covered by the four side walls 101. When the drive substrate unit 52 is moved by a predetermined distance toward the base plate 511, the lower ends of the four legs 528 come in contact with the base plate 511. This determines the position of the drive substrate unit 52 relative to the ejector unit 51 in the axial direction. That is, in the present embodiment, a "first positioner" is configured to determine the position of the drive substrate unit 52 relative to the ejector unit 51 in the axial direction by bringing the base plate 511 and the legs 528 into contact with each other.

Similarly, when the head body 81 is covered by the four side walls 101 (to be more specific, the four corners of the head body 81 are covered by the inner surfaces of the four legs 528), the inner surfaces of the four side walls 101 and the corners 811*a* of the head body 81 come in contact with each other. This determines the position of the drive substrate unit 52 relative to the ejector unit 51 in the horizontal direction parallel to the base plate 511. That is, in the present embodiment, the "first positioner" is also configured to determine the position of the drive substrate unit 52 relative to the ejector unit 51 in the horizontal direction parallel to the base plate 511 by bringing the inner surfaces of the four side walls 101 and the corners 811*a* of the head body 81 into contact with each other.

As shown in FIG. 9, the two positioning cylinders 529, each having a closed-end cylindrical shape, are further arranged between the drive substrate 522 and the inner surface of the case 521 (on the back surface of the drive substrate 522). Each of the two positioning cylinders 529 is fixedly attached to the back surface of the drive substrate 522 by, for example, screws. The two positioning cylinders 529 each has a recess 540. The recesses 540 are recessed upward in the axial direction from the lower end faces of the positioning cylinders 529. The recesses 540 have approximately the same shape as the first protrusions 86 of the ejector unit 51. That is, the recesses 540 have a frustoconical shape that tapers upward. Note that the recesses 540 are slightly larger than the first protrusions 86.

In the case of mounting the case 521 on the ejector unit 51, when the operator covers the head body 81 by the four side walls 101 as described above and then slides the four side walls 101 along the corners 811*a* of the head body 81, the upper tip ends of the first protrusions 86 fit into the recesses 540 of the positioning cylinders 529. At this time, since the first protrusions 86 have tapered tip ends, the first protrusions 86 can easily fit in the recesses 540. When the operator further brings the drive substrate unit 52 closer to the base plate 511, the first protrusions 86 fit deep into the recesses 540. Here, as described above, the recesses 540 have approximately the same shape as the first protrusions 86 and are slightly larger than the first protrusions 86. Thus, the first protrusions 86 fit deep without any gap in the recesses 540, and almost the entire first protrusions 86 come in contact with the recesses 540. As a result, the position of the drive substrate unit 52 relative to the ejector unit 51 can be determined precisely in the horizontal direction parallel to the base plate 511. That is, in the present embodiment, a "second positioner" is configured to determine the position of the drive substrate unit 52 relative to the ejector unit 51 in the horizontal direction parallel to the base plate 511 more precisely than the first positioner by fitting the first protrusions 86 in the recesses 540.

The configuration of the "second positioner" is, however, not limited thereto. For example, the second positioner may be configured such that protrusions provided to protrude downward at the drive substrate unit 52 may fit in recesses that are recessed downward at the ejector unit 51.

As described above, when mounting the case 521 on the ejector unit 51, the operator firstly causes the "first positioner" to move the legs 528 of the drive substrate unit 52 toward the base plate 511 of the ejector unit 51 while bringing the inner surfaces of the four side walls 101 of the drive substrate unit 52 into contact with the head body 81 of the ejector unit 51. In the process of moving the drive substrate unit 52 toward the base plate 511, the operator causes the second positioner to fit the first protrusions 86 of the ejector unit 51 deep into the recesses 540 of the drive substrate unit 52 so that the entire first protrusions 86 come in contact with the recesses 540. In the case of bringing the inner surfaces of the four side walls 101 of the drive substrate unit 52 into contact with the head body 81 of the ejector unit 51, the head body 81 and base plate 511 of the ejector unit 51 and the four side walls 101 and legs 528 of the drive substrate unit 52, which configure the first positioner, are visually recognizable from the outside. Thus, the operator is able to determine the position of the drive substrate unit 52 relative to the ejector unit 51 while visually checking the "first positioner" from the outside and then to more precisely determine the position of the drive substrate unit 52 relative to the ejector unit 51 by the "second positioner." As a result, the position of the drive substrate unit 52 relative to the ejector unit 51 can be determined with ease and higher precision.

When the first protrusions 86 are fitted deep in the recesses 540 by the second positioner, the drive-substrate-side connector 523 held in the case 521 and the ejector-side connector 514 of the ejector unit 51 are automatically and electrically connected to each other. This configuration allows the ejector-side connector 514 and the drive-substrate-side connector 523 to be accurately connected to each other without any displacement or the like. As a result, it is possible to eject the ink from the ejection outlets 830 by outputting the driving signal generated by the drive substrate 522 to the ejector unit 51 and controlling the piezo actuators 831 in accordance with the driving signal.

The head mounting unit 60 is a unit that is fixedly attached constitutively to the frame body of the printing device 1. The five head assemblies 50 are installed on the head mounting unit 60. The head mounting unit 60 includes a head adapter plate 601 and five through holes 602. The head adapter plate 601 is a plate-like member that expands into a long band-like shape in an XY plane. The five through holes 602 each penetrate the head adapter plate 601 in the axial direction. As will be described later, the ejector unit 51 and the drive substrate unit 52 that are mounted on each other are installed on a surface 601*f* of the head adapter plate 601 in the axial direction. When the inkjet head 351 is viewed in the axial direction with the ejector unit 51 and the drive substrate unit 52 installed on the surface 601*f* of the head adapter plate 601, each through hole 602 surrounds a plurality of nozzles 83 and is smaller in size than the base plate 511. Thus, the ejection outlets 830 of the nozzles 83 are exposed to the back surface 601*b* of the head adapter plate 601 through the through hole 602. As a result, it is possible to eject the ink from the ejector unit 51 through the through hole 602 of the head adapter plate 601 to the continuous forms paper 9 that is being transported under the ejection unit.

The head adapter plate 601 further has ten mounting holes 603. In the present embodiment, the mounting holes 603 are formed outside on both sides in the X direction of each of the five through holes 602. That is, two mounting holes 603 are formed beside each through hole 602. In the present embodiment, the mounting holes 603 are threaded holes formed from the surface 601*f* of the head adapter plate 601 toward the back surface 601*b*. The mounting holes 603 have internal threads formed therein.

Figure 10:
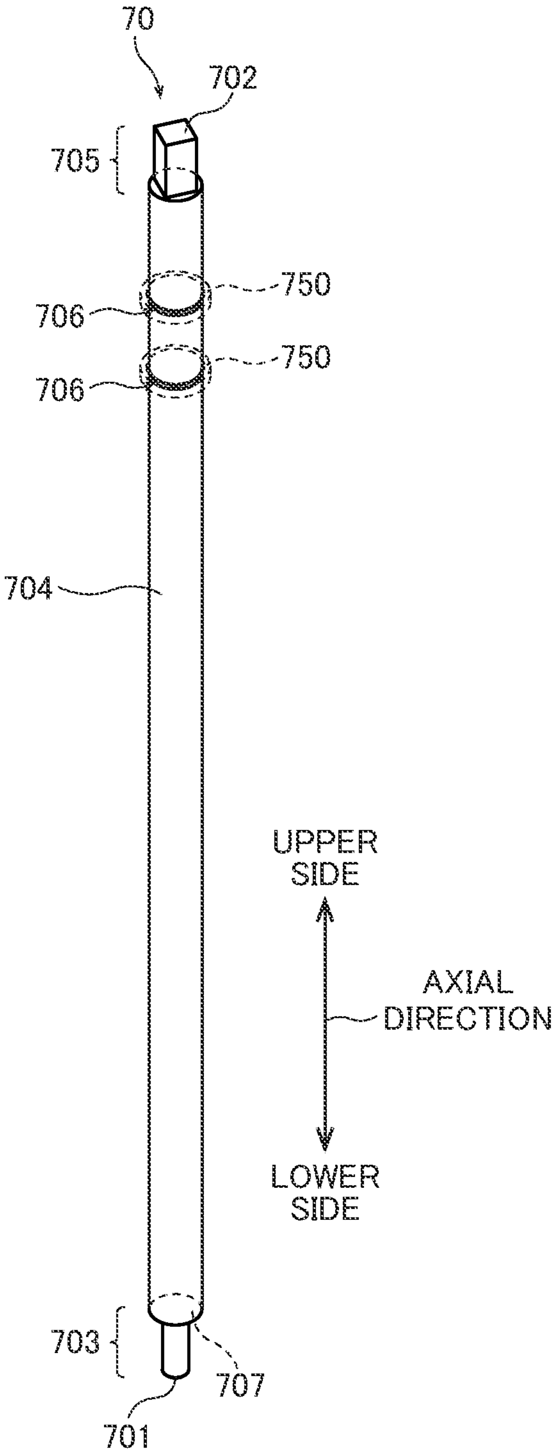
FIG. 10 is a perspective view of the coupling member.

The coupling members 70 are each a rod-like member used to couple the ejector unit 51, the drive substrate unit 52, and the head mounting unit 60 to one another. FIG. 10 is a perspective view of one coupling member 70. With the ejector unit 51 and the drive substrate unit 52 installed on the surface 601*f* of the head adapter plate 601, the coupling member 70 extends in the axial direction on the side of the narrow-face wall 112 of the case 521. Hereinafter, the lower end of the coupling member 70 is referred to as a first end 701, and the upper end of the coupling member 70 is referred to as a second end 702. As shown in FIG. 10, the coupling member 70 includes a minor-diameter portion 703, a major-diameter portion 704, and a polygonal prism portion 705.

The minor-diameter portion 703 is located at the first end 701 of the coupling member 70 and extends into a columnar shape in the axial direction. The minor-diameter portion 703 has an external thread. The diameter of the minor-diameter portion 703 is smaller than the diameters of the two positioning grooves 431 and 432 of the base plate 511. The major-diameter portion 704 is located on the side closer to the second end 702 than the minor-diameter portion 703 and extends into a columnar shape in the axial direction. The major-diameter portion 704 is a portion having a larger diameter than the minor-diameter portion 703. The diameter of the major-diameter portion 704 is larger than the diameters of the two positioning grooves 431 and 432 of the base plate 511. The polygonal prism portion 705 is a portion located at the second end 702 of the coupling member 70. In the present embodiment, the polygonal prism portion 705 extends into a square columnar shape in the axial direction. The shape of the polygonal prism portion 705 is, however, not limited thereto. The polygonal prism portion 705 may extend into a polygonal columnar shape in the axial direction.

Figure 11:
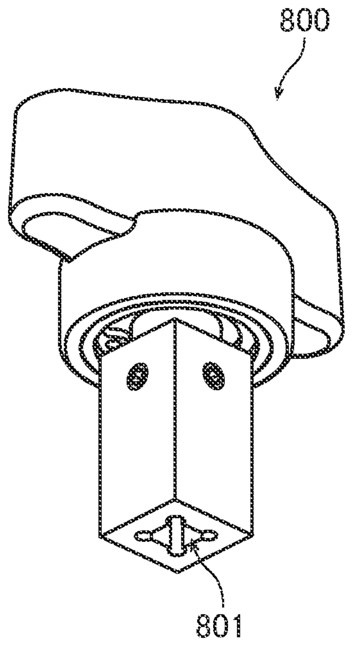
FIG. 11 is a perspective view of a torque wrench.

The second end 702 of the coupling member 70 can fit in a commercially available torque wrench 800 shown in FIG. 11. The torque wrench 800 has a horn-shaped drive 801 whose shape matches with the shape of the polygonal prism portion 705 (in the present embodiment, a square columnar shape).

When mounting the ejector unit 51 and the drive substrate unit 52 on the head adapter plate 601, the operator firstly mounts the ejector unit 51 and the drive substrate unit 52 on each other to form a head assembly 50. In this condition, the head assembly 50 is installed in the axial direction on the surface 601*f* of the head adapter plate 601 so as to cover a through hole 602. Then, using the two coupling members 70, the operator causes the minor-diameter portions 703 of the coupling members 703 to penetrate the two positioning grooves 431 and 432 of the base plate 511 and fit in the two mounting holes 603. At this time, the major-diameter portions 704 of the coupling members 70 do not penetrate the positioning grooves 431 and 432 of the base plate 511. Thus, end faces 707 of the major-diameter portions 704 that are located adjacent to the minor-diameter portions 703 come in contact with the exposed portions 401 and 402 of the base plate 511 and press the exposed portions 401 and 402 in the downward direction.

Accordingly, the two coupling members 70 are fixedly connected to the two mounting holes 603 while determining the position of the base plate 511 in the positioning grooves 431 and 432. As a result, the end faces 707 of the two coupling members 70 (the lower surfaces of the major-diameter portions 704) can fixedly attach the ejector unit 51 including the base plate 511 and the drive substrate unit 52 mounted on the ejector unit 51 to the head adapter plate 601. Note that portions of the head assembly 50 that come in contact with the coupling member 70 and press the coupling member 70 are only portions that are located in the vicinity of the positioning grooves 431 and 432 of the base plate 511. This reduces the occurrence of distortion of the other members of the head assembly 50 such as the other cases 521.

In the present embodiment, with the ejector unit 51 and the drive substrate unit 52 fixedly mounted on the head adapter plate 601, the feed ink line 515 and the exhaust ink line 516 extend in the axial direction at positions closer to the narrow-face wall 112 than the coupling members 70. That is, the coupling members 70 are located farther from the case 521 than the feed ink line 515 and the exhaust ink line 516. This further reduces the occurrence of distortion of the case 521 or the like due to the pressure applied from the coupling members 70.

Each coupling member 70 includes two grooves 706. The two grooves 706 are recessed inward along the entire periphery in part of the coupling member 70 in the axial direction. In the present embodiment, the two grooves 706 are provided at an interval from each other in the axial direction in the major-diameter portion 704 of the coupling member 70. For example, a resin ring may be fitted in each groove 706. This forms two flanges 750 that protrude into a ring shape along the entire periphery in the major-diameter portion 704 of the coupling member 70.

Here, the diameter of the major-diameter portion 704 other than portions corresponding to the flanges 750, is smaller than the diameter of each support hole 106 provided in the two support members 105 of the case 521 aligned in the axial direction. Thus, the coupling member 70 other than the portions corresponding to the flanges 750 is freely movable in the axial direction while passing through each of the two support holes 106. However, the flanges 750 have a larger diameter than the support holes 106. Thus, the flanges 750 are incapable of passing through the support holes 106 and come in contact with the support members 105. In the present embodiment, the coupling member 70 other than the portions corresponding to the flanges 750 is passed through the two support holes 106 aligned in the axial direction, and the flanges 750 are located between the two support members 105 in the axial direction. This allows the coupling member 70 to be held by the support members 105 and avoids a drop of the coupling member 70. As a result, it is possible to further improve workability in the case of mounting the head assembly 50 on the head adapter plate 601.

As shown in FIG. 4, in the present embodiment, one inkjet head 351 includes the five head assemblies 50 arranged in zigzag form (in a staggered manner) on the head adapter plate 601. The five head assemblies 50 are fixedly mounted on the surface 601*f* of the head adapter plate 601 via the corresponding coupling members 70 while the side walls 101 are located in close proximity to one another. With the five head assemblies 50 fixedly mounted on the head adapter plate 601, the space between the narrow-face walls 112 of the head assemblies 50 located in close proximity to one another is greater than the space between the wide-face walls 111 of the head assemblies 50 located in close proximity to one another. As described above, in the case of mounting each head assembly 50 on the head adapter plate 601, the minor-diameter portions 703 of the two coupling members 70 held on the side of the narrow-face walls 112 of the case 521 are caused to pass through the two positioning grooves 431 and 432 of the base plate 511 into threaded engagement with the two mounting holes 603. That is, the present embodiment further improves workability because work can be conducted on the side of the narrow-face walls 112 where there is relatively space for work.

The second end 702 of each coupling member 70 on the side opposite to the first end 701 fixedly connected to the mounting hole 603 of the head adapter plate 601 protrudes more upwardly in the axial direction than the ejector unit 51 and the drive substrate unit 52 (see FIG. 5). This makes it easier to fit the second end 702 of the coupling member 70 in the torque wrench 800. As a result, it is possible to further improve workability in the case of mounting the head assembly 50 on the head adapter plate 601.

In the present embodiment, the feed ink line 515, the exhaust ink line 516, the feed cooling lines 526, and the exhaust cooling lines 527 each also extend in the axial direction on the side of the narrow-face walls 112 of the case 521. This further improves workability because work such as exchange of each single one of these lines can also be conducted on the side of the narrow-face walls 112 where there is relatively space for work.

In the present embodiment, the inkjet heads 351 with the above-described configuration facilitates the exchange of each component including the ejector unit 51 that is consumed relatively early. When the ejector unit 51 and the drive substrate unit 52 are mounted again on each other, the ejector-side connector 514 and the drive-substrate-side connector 523 can be connected to each other accurately without any displacement or the like. As a result, it is possible to eject the ink again from the ejection outlets 830 by outputting the driving signal generated by the drive substrate 522 to the ejector unit 51 and controlling the piezo actuators 831 in accordance with the driving signal.

2. Variations

Although one embodiment of the present invention has been described thus far, the present invention is not limited to this embodiment.

In the above-described embodiment, the ink feeders 28 are configured to supply the temperature-controlled ink to the inkjet heads 351 while circulating the ink among the inkjet heads 351. Alternatively, the ink feeders 28 may be configured to supply the ink in one direction to the inkjet heads 351.

In the above-described embodiment, each ejector 512 includes one internal tank 82. Alternatively, the ejector 512 may include a plurality of internal tanks 82. For example, although not shown, the ejector 512 may include a first internal tank 82*a* that communicates to the first communication path 41 (see FIG. 8) (ink-feed-side internal tank 82*a*) and a second internal tank 82*b* that communicates to the second communication path 42 (see FIG. 8) (ink-exhaust-side internal tank 82*b*). Then, each of the first internal tank 82*a* and the second internal tank 82*b* may communicate to the ink chambers 832 and the ejection outlets 830 (see FIG. 2). A configuration may also be such that the ink is supplied from the first communication path 41 through the first internal tank 82*a* to the ink chambers 832 and exhausted from the ink chambers 832 through the second internal tank 82*b* to the second communication path 42.

The configurations of the above-described preferred embodiment and variations may be appropriately combined as long as there are no mutual inconsistencies.

REFERENCE SIGNS LIST

1 printer
9 continuous forms paper
28 ink feeder
29 controller
40 base through hole
41 first communication path
42 second communication path
50 head assembly
51 ejector unit
52 drive substrate unit
60 head mounting unit
70 coupling member
81 head body
82 internal tank
83 nozzle
84 bracket
86 first protrusion
87 second protrusion
101 side wall
102 top plate
104 locking member
105 support member
106 support hole
110 notch
111 wide-face wall
112 narrow-face wall
351 inkjet head
401 exposed portion
402 exposed portion
410 first opening
420 second opening
431 positioning groove
432 positioning groove
511 base plate
512 ejector
514 ejector-side connector
515 feed ink line
516 exhaust ink line
521 case
522 drive substrate
523 drive-substrate-side connector
525 cooling jacket
528 leg
540 recess
601 head adapter plate
603 mounting hole
701 first end
702 second end
703 minor-diameter portion
704 major-diameter portion
705 polygonal prism portion
707 end face

750 flange
800 torque wrench
830 ejection outlet
831 piezo actuator

The invention claimed is:

1. An inkjet head for performing printing on a printing medium by ejecting ink onto the printing medium, the inkjet head comprising:
an ejector unit that ejects the ink in accordance with a driving signal; and
a drive substrate unit that supplies the driving signal to the ejector unit,
wherein the ejector unit includes:
a base plate;
an ejector that ejects the ink from an ejection outlet to the base plate, the ejector being arranged in the base plate; and
an ejector-side connector that receives the driving signal,
the drive substrate unit includes:
a drive substrate that generates the driving signal;
a drive-substrate-side connector that outputs the driving signal; and
a case that holds the drive substrate and the drive-substrate-side connector,
the drive substrate unit is detachable from the ejector unit in an axial direction orthogonal to the base plate,
when the case is mounted on the ejector unit, the drive-substrate-side connector and the ejector-side connector are connected to each other and form an exposed portion that exposes part of the base plate,
the ejector includes:
an internal tank that temporarily stores the ink ejected from the ejection outlet; and
a head body where the internal tank is arranged therein and has a side wall being in parallel with the axial direction,
the ejector unit further includes:
a feed ink line that passes the ink supplied to the internal tank; and
a first opening formed in the exposed portion and communicating to the internal tank,
the case includes:
a side wall that expands into a cylinder shape towards one side in the axial direction; and
a top plate that covers an end of the side wall on the other side in the axial direction opposite to the one side in the axial direction, the end being away from the base plate,
the feed ink line is connected to the first opening at an end on the one side in the axial direction and extends toward the other side along the side wall,
the end on the other side in the axial direction is located on a side closer to the other side than the top plate, and
when the case is mounted on the ejector unit, the side wall of the case has an inner surface being contact with the side wall of the head body.

2. The inkjet head according to claim 1, wherein
the drive substrate unit further includes a locking member fixedly attached to the side wall of the case, the locking member detachably locking an intermediate portion of the feed ink line in the axial direction.

3. The inkjet head according to claim 1, wherein
the ejector unit further includes:
an exhaust ink line that passes the ink exhausted from the internal tank; and
a second opening formed in the exposed portion and communicating to the internal tank, and
the exhaust ink line is connected to the second opening at an end on the one side in the axial direction and extends toward the other side along the side wall.

4. The inkjet head according to claim 3, wherein
the internal tank includes a first internal tank on an ink feed side and a second internal tank on an ink exhaust side,
the first internal tank communicates to the ejection outlet and the first opening, and
the second internal tank communicates to the ejection outlet and the second opening.

5. The inkjet head according to claim 3, wherein
the drive substrate unit further includes:
a cooling jacket that cools the drive substrate by passing a cooling medium therein, the cooling jacket being arranged between the drive substrate and an inner surface of the case;
a feed cooling line that passes the cooling medium supplied to the cooling jacket; and
a connection port formed in the side wall and connected to the cooling jacket,
the feed cooling line is connected to the connection port at an end on the one side and extends toward the other side along the side wall, and
when the ejector unit and the drive substrate unit are mounted on each other, the connection port is separated from the first opening and the second opening in the axial direction.

6. The inkjet head according to claim 1, wherein
the case has four side walls that expand into a square cylinder shape in the axial direction;
the four side walls include:
a pair of wide-face walls facing each other; and
a pair of narrow-face walls facing each other and having a smaller surface area than the pair of wide-face walls,
the feed ink line extends toward the other side in the axial direction along and on the side of one of the narrow-face wall.

7. The inkjet head according to claim 1, wherein
the case has four side walls that expand into a square cylinder shape in the axial direction;
the head body has a four side walls that expand into a square cylinder shape in the axial direction,
the square cylinder configured by the four side walls of the case is slightly larger than the square cylinder configured by the four side walls of the head body.

8. The inkjet head according to claim 1, wherein
the base plate is a plate-like member that expands in a longitudinal direction,
perpendicular to the axial direction, and expands in a transverse direction, also perpendicular to the axial direction,
the case has a four side walls that expand into a square cylinder shape in the axial direction;
the four side walls include:
a pair of wide-face walls being parallel to the longitudinal direction and facing each other; and
a pair of narrow-face walls being parallel to the transverse direction, facing each other and having a smaller surface area than the pair of wide-face walls,
the first opening is formed at one end of the base plate in the longitudinal direction, and
the feed ink line extends toward the other side in the axial direction along the narrow-face wall on one side of the longitudinal direction of the pair of narrow-face walls, on the one side of the longitudinal direction, relative to the head body, but not along the narrow-face wall on the other side of the longitudinal direction or the pair of wide-face walls.

* * * * *